(12) United States Patent
Seki et al.

(10) Patent No.: US 9,751,361 B2
(45) Date of Patent: Sep. 5, 2017

(54) SEAL DEVICE FOR A WHEEL BEARING

(71) Applicant: NTN Corporation, Osaka (JP)

(72) Inventors: Makoto Seki, Iwata (JP); Tomoko Baba, Iwata (JP)

(73) Assignee: NTN Corporation, Osaka-shi (JP)

( * ) Notice: Subject to any disclaimer, the term of this patent is extended or adjusted under 35 U.S.C. 154(b) by 388 days.

(21) Appl. No.: 14/513,039

(22) Filed: Oct. 13, 2014

(65) Prior Publication Data

US 2015/0028663 A1    Jan. 29, 2015

Related U.S. Application Data

(63) Continuation of application No. PCT/JP2013/060989, filed on Apr. 11, 2013.

(30) Foreign Application Priority Data

Apr. 13, 2012  (JP) ................. 2012-091875

(51) Int. Cl.
   *B60B 27/00*    (2006.01)
   *F16J 15/3264*  (2016.01)
   *F16C 33/78*   (2006.01)
   *F16C 41/00*   (2006.01)
   *F16J 15/16*   (2006.01)
(Continued)

(52) U.S. Cl.
CPC ...... *B60B 27/0073* (2013.01); *F16C 33/7813* (2013.01); *F16C 33/7823* (2013.01); *F16C 33/7883* (2013.01); *F16C 41/007* (2013.01); *F16J 15/164* (2013.01); *F16J 15/3212* (2013.01); *F16J 15/3264* (2013.01); *B60B 27/001* (2013.01); *F16C 19/386* (2013.01); *F16C 2326/02* (2013.01)

(58) Field of Classification Search
CPC ........................................ F16J 15/32
See application file for complete search history.

(56) References Cited

U.S. PATENT DOCUMENTS 5,722,664 A * 3/1998 Otto ............... F16C 33/7813
                                                   277/559
7,942,584 B2 * 5/2011 Norimatsu ........ F16C 33/7883
                                                   277/349
(Continued)

FOREIGN PATENT DOCUMENTS

CN        102788109 A * 11/2012
DE   102 2006 047 016     4/2007
(Continued)

*Primary Examiner* — Vishal Patel
(74) *Attorney, Agent, or Firm* — Harness, Dickey & Pierce, P.L.C.

(57) ABSTRACT

A wheel bearing has a seal device formed as a pack seal with an annular sealing plate and slinger. The sealing plate has a metal core and an integrally adhered sealing member. The sealing member has a base portion, side lip and radial lip. The base portion covers an inner circumferential surface of the metal core. The radial lip slidingly contacts the cylindrical portion of the slinger. A garter spring is mounted on the radial lip. A tightening force of the garter spring is set to 50% or more of a total tightening force of the radial lip. The tightening force of the radial lip without the garter spring is set to 3N or more.

14 Claims, 6 Drawing Sheets

(51) Int. Cl.
 *F16J 15/3212* (2016.01)
 *F16C 19/38* (2006.01)

(56) References Cited

U.S. PATENT DOCUMENTS

| | | | |
|---|---|---|---|
| 2005/0206097 A1* | 9/2005 | Datta | F16J 15/3212 |
| | | | 277/644 |
| 2006/0103075 A1* | 5/2006 | Zahn | B62K 25/08 |
| | | | 277/436 |
| 2008/0044120 A1 | 2/2008 | Komori | |
| 2009/0058011 A1* | 3/2009 | Shibayama | B60B 27/0005 |
| | | | 277/361 |

FOREIGN PATENT DOCUMENTS

| | | |
|---|---|---|
| EP | 0 304 160 | 2/1989 |
| EP | 1 484 519 | 12/2004 |
| EP | 1 548 307 | 6/2005 |
| JP | 56-119059 | 2/1955 |
| JP | 2003-269617 | 9/2003 |
| JP | 2005-299685 / | 10/2005 |
| JP | 2006-161917 | 6/2006 |
| JP | 2006-200616 | 8/2006 |
| JP | 2009-115273 | 5/2009 |
| JP | 2010-190323 | 9/2010 |
| JP | 2012-017019 | 1/2012 |
| WO | WO03/074890 | 9/2003 |
| WO | WO2009/060584 | 5/2009 |
| WO | WO2010/069703 | 6/2010 |

\* cited by examiner

[Fig 1]
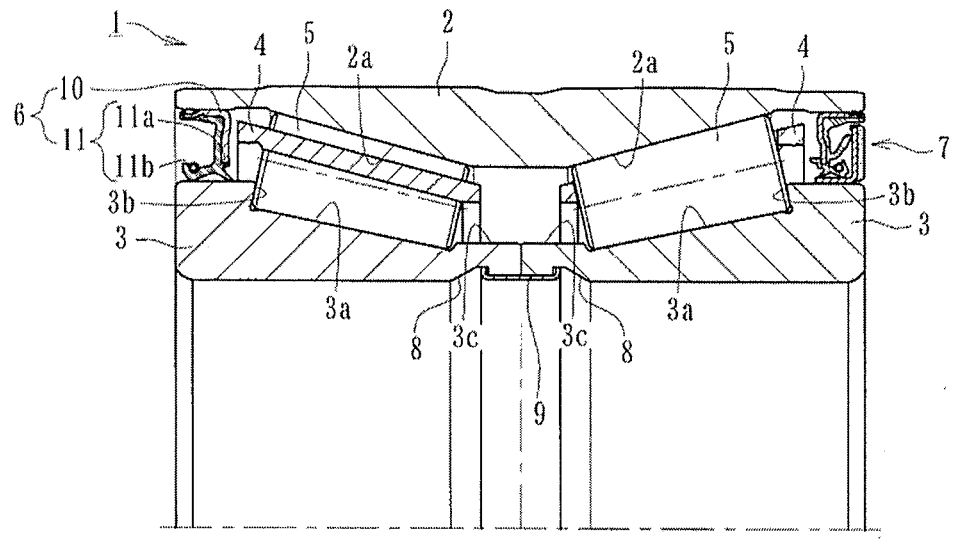
[Fig 2]
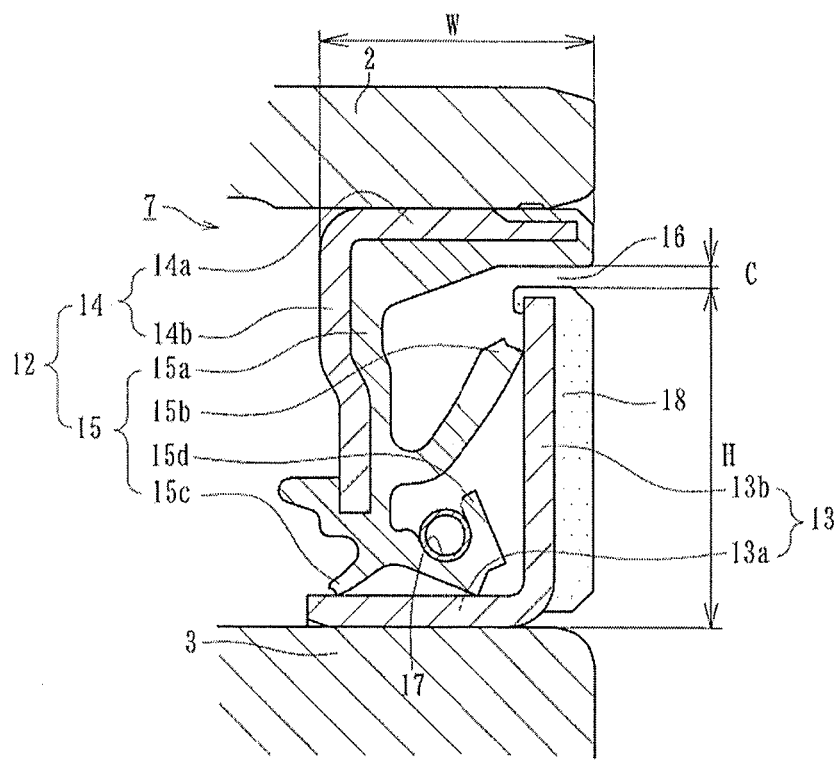

[Fig 3]
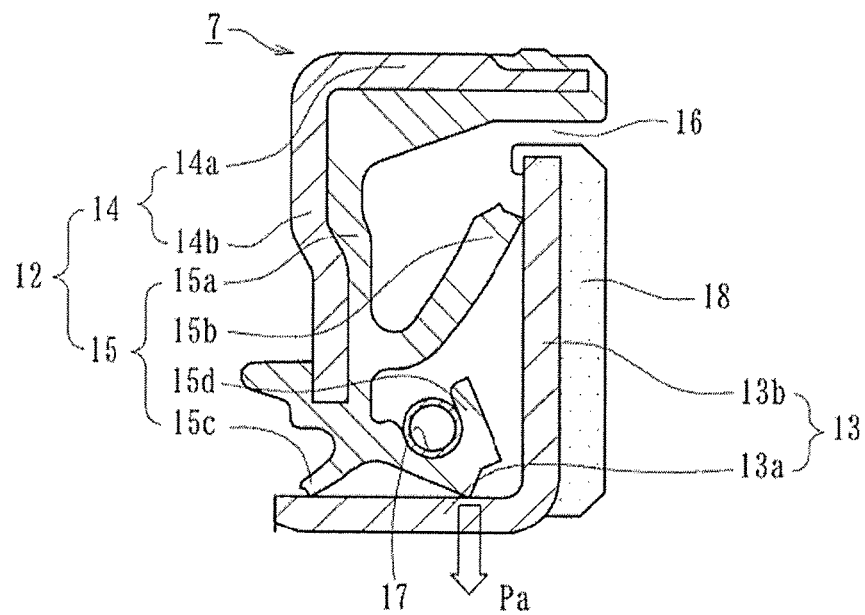
[Fig 4]
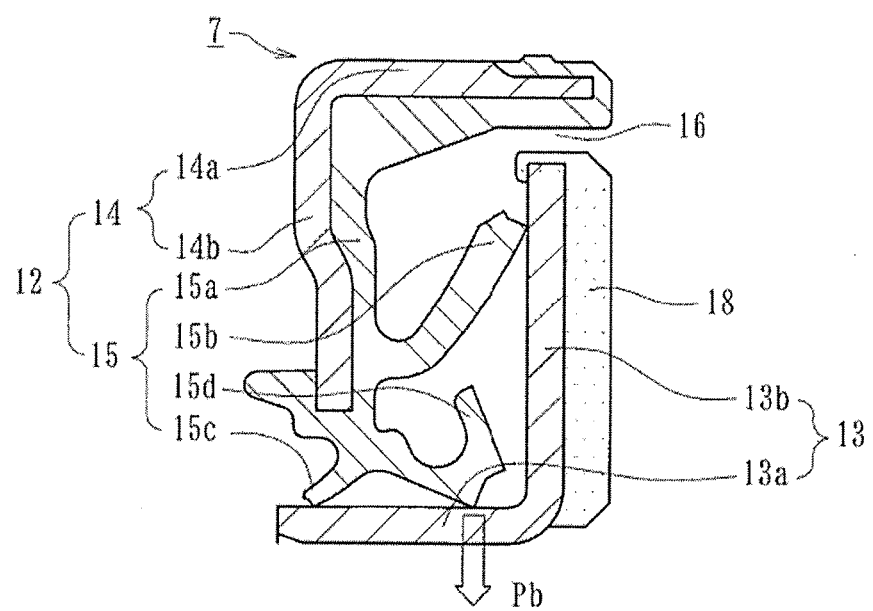

[Fig 5]
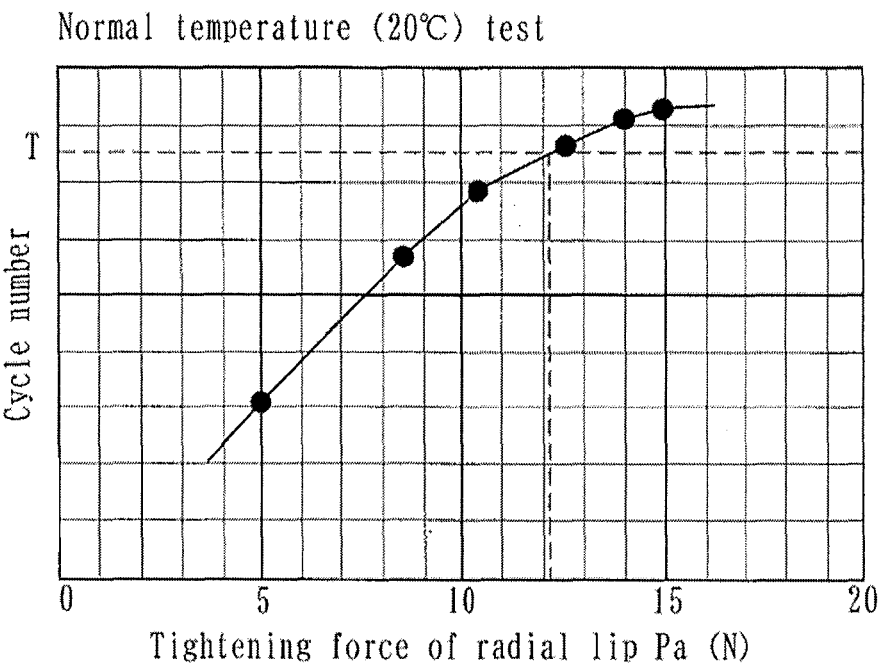
[Fig 6]
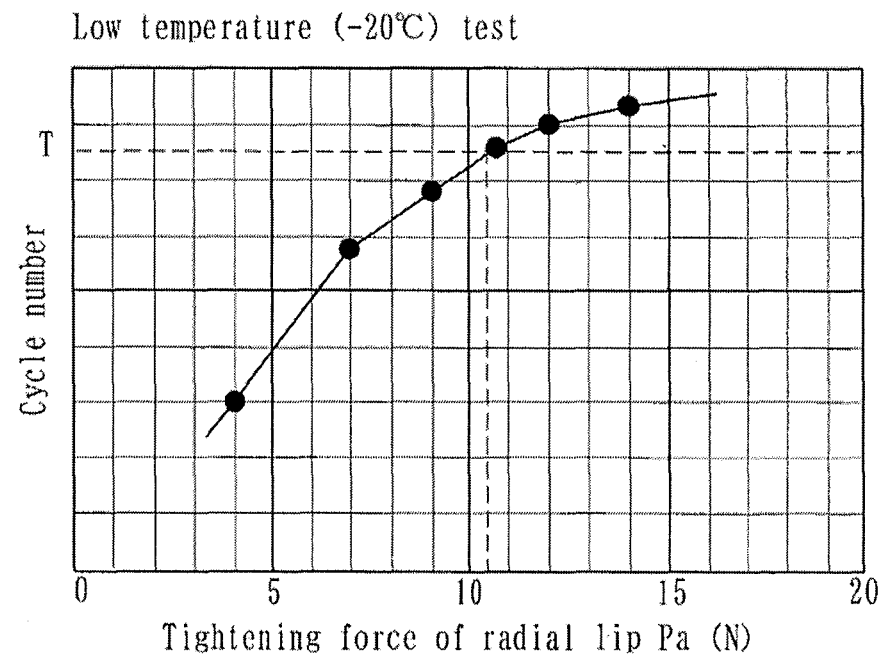

[Fig 7]
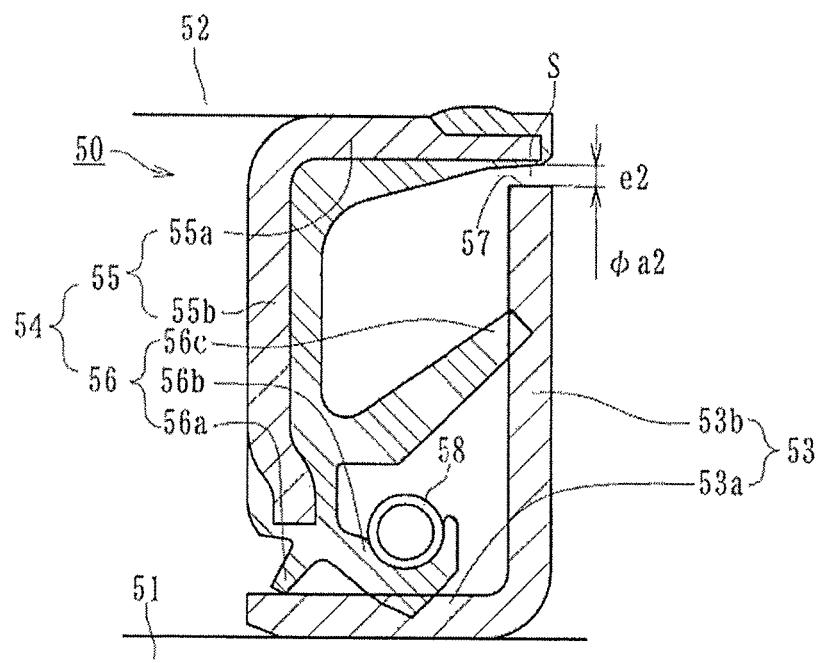
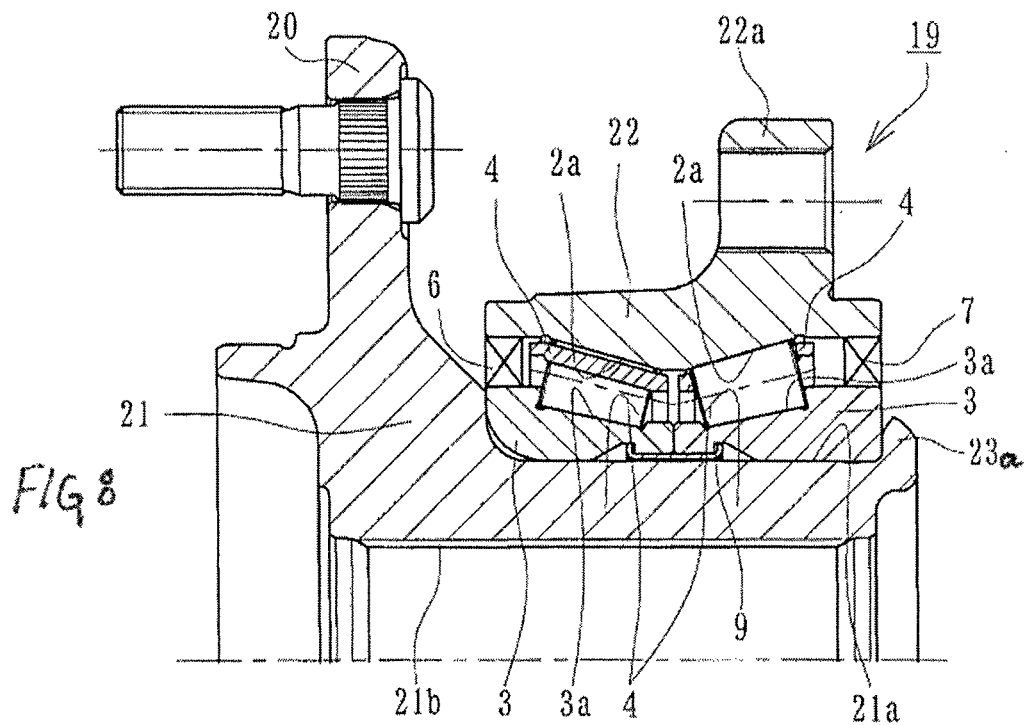
FIG 8

SEAL DEVICE FOR A WHEEL BEARING

CROSS-REFERENCE TO RELATED APPLICATIONS

This application is a continuation of International Application No. PCT/JP2013/060989, filed Apr. 11, 2013, which claims priority to Japanese Application No. 2012-091875, filed Apr. 13, 2012. The disclosures of the above applications are incorporating herein by reference.

FIELD

The present disclosure relates to vehicle wheel bearings and, more particularly, a wheel bearing seal device that rotationally supports wheels of a vehicle relative to the vehicle suspension apparatus.

BACKGROUND

A wheel bearing apparatus is intended to freely rotationally support a wheel hub that mounts a wheel, via a double row rolling bearing. The wheel bearings are used for driving wheels and driven wheels. Due to structural reasons, the inner ring rotation type is used for driving wheels and both the inner ring rotation type and outer ring rotation type are used for driven wheels. There are four generation types of wheel bearing apparatus. A first generation type has a wheel bearing with double row angular contact ball bearing, etc. fit between a knuckle, forming part of a suspension apparatus, and the wheel hub. A second generation type has a body mounting flange or a wheel mounting flange directly formed on the outer circumference of an outer member of the wheel bearing apparatus. A third generation type has one inner raceway surface directly formed on the outer circumference of the wheel hub. A fourth generation type has the inner raceway surface directly formed on the outer circumference, respectively, of the wheel hub and an outer joint member of a constant velocity universal joint.

In these wheel bearings, a seal device is provided to prevent leakage of grease sealed inside the bearing and to prevent entry of rain water or dust from the outside into the bearing. One cause of premature damage of the seal device is that the seal device is used under severe environmental conditions, such as low temperatures and muddy water. It is believe that deterioration of the tightening force and followability of the sealing member occurs due to a reduction of elasticity under low environmental temperatures. This still occurs even if the sealing member is formed of improved material with low temperature properties. Thus, premature entry of muddy water into the inside of the bearing occurs. The sealability under low environmental temperatures can be improved by providing a garter spring on the sealing member. This maintains the tightening force and followability even under low temperature.

One example of a prior art seal device with a garter spring is shown in FIG. 7. This seal device 50 is a so-called pack-seal. It includes a slinger 53 and a sealing plate 54, disposed between an inner member 51 and an outer member 52, coaxially arranged with each other.

The slinger 53 has a cylindrical portion 53a and an annular portion. The cylindrical portion 53a is press-fit onto the outer circumference of the inner member 51. The annular portion 53b extends radially outward from the cylindrical portion 53a. The sealing plate 54 has a metal core 55 and a sealing member 56 integrally adhered to the metal core 55, via vulcanized adhesion. The metal core has a cylindrical portion 55a and an annular portion 55b. The cylindrical portion 55a is press-fit into the inner circumference of the outer member 52. The annular portion 55b extends radially inward from the cylindrical portion 55a.

The sealing member 56 is formed from a rubber material. It includes a grease lip 56a, a dust lip 56b and an axial lip 56c. The grease lip 56a and dust lip 56b are in sliding contact with the cylindrical member 53a of the slinger 53. The axial lip 56c is in sliding contact with the annular portion 53b.

The cylindrical portion 53a of the slinger 53 and the cylindrical portion 55a of the metal core 55 oppose one another in a radial direction, via a predetermined radial distance. The annular portion 53b of the slinger 53 and the annular portion 55b of the metal core 55 also oppose one another in an axial direction, via a predetermined axial distance. The former is positioned at an axially inboard-side and the latter is positioned at an axially outboard-side. An annular gap "S", forming a labyrinth seal, is formed between a radially outermost end face 57 of the annular portion 53b of the slinger 53 and the cylindrical portion 55a of the metal core 55.

The radially outermost end face 57 of the annular portion 53b of the slinger 53 is precisely finished by machining. Thus, a dimension "$\phi a2$" of the outer diameter of the annular portion 53b of the slinger 53 and a dimension "e2" of the gap "S" have high precision. This enables finishing of the radially outermost end face 57 with a surface without any excess material, such as burrs, to improve sealability while reducing the gap "S" to as small as possible. See, JP2010-190323 A.

SUMMARY

According to the prior art seal device 50, the garter spring 58 is mounted on the dust lip 56b. Thus, it is possible to keep the tightening force and to prevent deterioration of the followability. However, not only the tightening force of the dust lip 56b but a ratio of the tightening force of the garter spring 58, among the total tightening force of the dust lip 56b, has not been analyzed and managed. Thus, there is a variation in the sealability at normal temperatures and at low temperatures.

It is, therefore, an object of the present disclosure to provide a desired tightening force on the radial lip of the pack-seal. Also, it is an object to provide a wheel bearing seal device that improves the sealability under both low environmental temperatures and muddy water environments.

To achieve the object of the present disclosure, a seal device for a wheel bearing comprises an outer member with double row outer raceway surfaces formed on its inner circumference. An inner member includes a wheel hub and at least one inner ring fit onto a cylindrical portion of the wheel hub. Alternatively, it may include an outer joint member of a constant velocity universal joint. The wheel hub is integrally formed with a wheel mounting flange on its one end. A cylindrical portion axially extends from the wheel mounting flange. The inner member outer circumference includes double row inner raceway surfaces that oppose the double row outer raceway surfaces. Double row rolling elements are rollably contained between the inner and outer raceway surfaces. The seal is mounted on the wheel bearing. It seals an annular opening space formed between the outer member and inner member. The seal device is formed as a pack seal. The pack seal includes an annular sealing plate and an annular slinger. Both have a substantially "L" shaped cross-section and are arranged opposite to each other. The sealing plate has a metal core and a sealing member integrally adhered to the metal core, via galvanized adhesion. The metal core is press-formed from steel sheet and includes a cylindrical fitting portion. The cylindrical fitting portion is adapted to be press-fit into an inner circumference of the end of the outer member, via a predetermined interference. A radially inner portion extends radially inward from one end of the fitting portion. The slinger includes a cylindrical portion and a standing portion. The cylindrical portion is adapted to be press-fit onto an outer circumference of the inner member. The standing portion extends radially outward from the cylindrical portion. The sealing member includes a base portion covering an inner circumferential surface of the metal core. A side lip inclines radially outward from the base portion. The side lip slidingly contacts the standing portion of the slinger, via a predetermined axial interference. A radial lip inclines radially inward from the side lip. The radial lip slidingly contacts the cylindrical portion of the slinger, via a predetermined radial interference. A garter spring is mounted on the radial lip. The tightening force of the garter spring is set to 50% or more of total tightening force of the radial lip. The tightening force of the radial lip without the garter spring is set to 3N or more.

According to the seal device, the pack seal comprises an annular sealing plate and an annular slinger. Each has a substantially "L" shaped cross-section and are arranged opposite toward each other. The sealing plate includes a metal core and a sealing member integrally adhered to the metal core, via galvanized adhesion. The metal core is press-formed from steel sheet. The metal core includes a cylindrical fitting portion adapted to be press-fit into an inner circumference of the end of the outer member, via a predetermined interference. A radially inner portion extends radially inward from one end of the fitting portion. The slinger includes a cylindrical portion and a standing portion. The cylindrical portion is adapted to be press-fit onto an outer circumference of the inner member. The standing portion extends radially outward from the cylindrical portion. The sealing member includes a base portion covering an inner circumferential surface of the metal core. A side lip inclines radially outward from the base portion and slidingly contacts the standing portion of the slinger, via a predetermined axial interference. A radial lip inclines radially inward from the side lip and slidingly contacts the cylindrical portion of the slinger, via a predetermined radial interference. A garter spring is mounted on the radial lip. The tightening force of the garter spring is set to 50% or more of the total tightening force of the radial lip. The tightening force of the radial lip without the garter spring is set to 3N or more. Thus, it is possible to provide a seal device for a wheel bearing that can eliminate variation in the sealability at normal temperatures and at low temperatures. Also, it improves the sealability under both low temperature environments and muddy water environments. In addition, it is possible to surely maintain the tightening force of the radial lip sufficient to keep the rigidity of the garter spring.

The tightening force of the radial lip at the normal temperature (20° C.) is set to 12N or more. This makes it possible to keep stable sealability.

The tightening force of the radial lip at a low temperature (−20° C.) is set to 10N or more. This makes it possible to surely keep sealability at a low temperature.

TR 10 of the sealing member is set to −35° C. or less. This makes it possible to keep the lip followability under low temperature environments. Thus, this improves the muddy water resistance.

The garter spring is formed of stainless steel. This keeps high corrosion resistance for a long term.

The tip end of the fitting portion of the metal core is thinned. The sealing member is adhered to the tip end so that it wraps up the tip end to form a "half metal structure". This improve the sealability of the fitting portion of the metal core. Thus, this protects the inside of the bearing.

The base portion of the sealing member is inclined toward the tip end of the fitting portion of the metal core. The outer peripheral edge of the standing portion of the slinger opposes the tip end of the sealing member, via a slight radial gap, to form a labyrinth seal. The radial gap is set to 0.75 mm or less. This prevents the entry of rain water or dust from the outside into the inside of the bearing. Also, it discharges, once entered, rain water or dust to the outside of the bearing by centrifugal force. Thus, this improves the sealability of the bearing.

The seal device for a wheel bearing includes an outer member formed with double row outer raceway surfaces on its inner circumference. An inner member includes a wheel hub and at least one inner ring fit onto a cylindrical portion of the wheel hub or an outer joint member of a constant velocity universal joint. The wheel hub is integrally formed with a wheel mounting flange on its one end. A cylindrical portion axially extends from the wheel mounting flange. The inner member outer circumference is formed with double row inner raceway surfaces that oppose the double row outer raceway surfaces. Double row rolling elements are rollably contained between the inner and outer raceway surfaces. The seal is mounted on the wheel bearing to seal an annular opening space formed between the outer member and inner member. The seal device is formed as a pack seal with an annular sealing plate and an annular slinger. Both have a substantially "L" shaped cross-section and are arranged opposite to each other. The sealing plate includes a metal core and a sealing member integrally adhered to the metal core, via galvanized adhesion. The metal core is press-formed from steel sheet and includes a cylindrical fitting portion and a radial inner portion. The cylindrical fitting portion is adapted to be press-fit into an inner circumference of the end of the outer member, via a predetermined interference. The radially inner portion extends radially inward from one end of the fitting portion. The slinger includes a cylindrical portion and a standing portion. The cylindrical portion is adapted to be press-fit onto an outer circumference of the inner member. The standing portion extends radially outward from the cylindrical portion. The sealing member includes a base portion covering an inner circumferential surface of the metal core. A side lip inclines radially outward from the base portion and slidingly contacts the standing portion of the slinger, via a predetermined axial interference. A radial lip inclines radially inward from the side lip and slidingly contacts the cylindrical portion of the slinger, via a predetermined radial interference. A garter spring is mounted on the radial lip. The tightening force of the garter spring is set to 50% or more of total tightening force of the radial lip. The tightening force of the radial lip without the garter spring is set to 3 N or more. Thus, it is possible to provide a seal device for a wheel bearing that can eliminate variations in sealability at normal temperatures and at low temperatures. This improves the sealability under both low temperature environments and muddy water environments.

In addition, it is possible to surely maintain the tightening force of the radial lip sufficient to keep the rigidity of the garter spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of one embodiment of a seal device of a wheel bearing;

FIG. 2 is a partially enlarged view of FIG. 1 of one seal device;

FIG. 3 is an explanatory view of a total tightening force of the seal device of FIG. 2;

FIG. 4 is an explanatory view of a tightening force under a condition where the dust lip is not provided with a garter spring;

FIG. 5 is a graph showing measurement results of the tightening force of a radial lip under a severe environment at a normal temperature;

FIG. 6 is a graph showing measurement results of the tightening force of a radial lip under a severe environment at a low temperature;

FIG. 7 is a longitudinal-section view of a prior art seal device;

FIG. 8 is a cross-section view of a second generation type wheel bearing;

DETAILED DESCRIPTION

Figure 9:
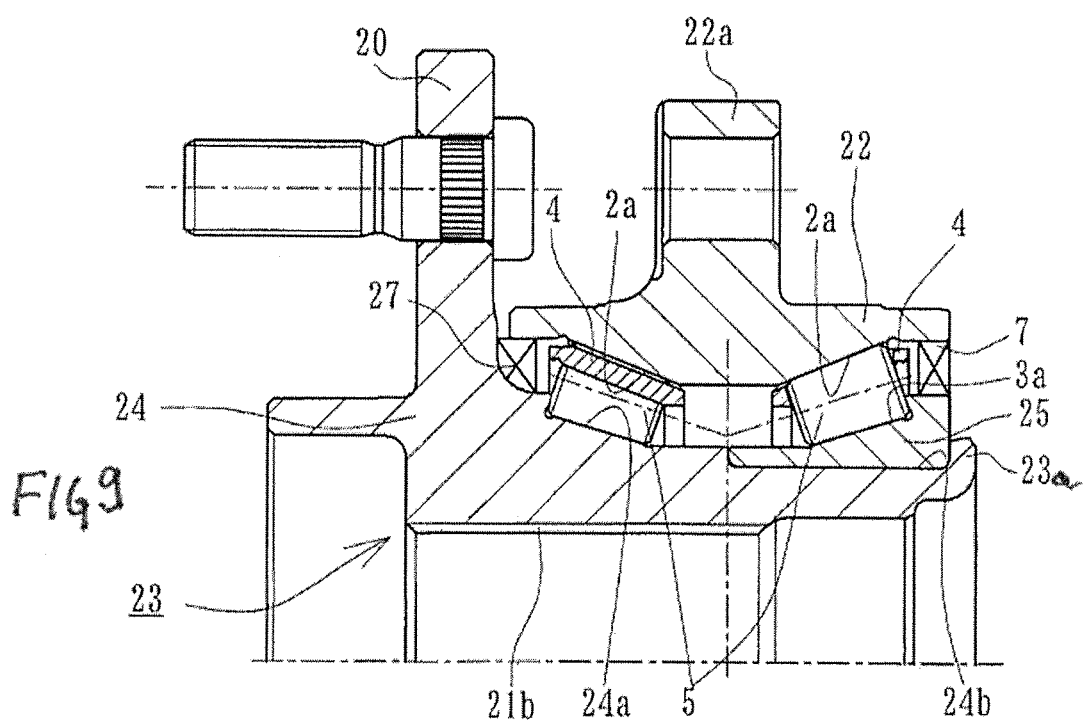
FIG. 9 is a cross-section view of a third generation type wheel bearing.

A seal device for a wheel bearing is adapted to be mounted on the wheel bearing to seal an annular opening space between the outer member and inner member. The wheel bearing includes an outer member formed with double row outer raceway surfaces on its inner circumference. An inner member includes one pair of inner rings. Each ring is formed, on its outer circumference, with a double row inner raceway surface. The double row inner raceway surfaces oppose the double row outer raceway surfaces. Double row rolling elements are rollably contained between the inner and outer raceway surfaces. The seal device is formed as a pack seal with an annular sealing plate and an annular slinger. Both have a substantially "L" shaped cross-section and are arranged opposite toward each other. The sealing plate includes a metal core and a sealing member integrally adhered to the metal core, via galvanized adhesion. The metal core is press-formed from steel sheet and includes a cylindrical fitting portion and a radially inner portion. The cylindrical fitting portion is adapted to be press-fit into an inner circumference of the end of the outer member, via a predetermined interference. The radially inner portion extends radially inward from one end of the fitting portion. The slinger includes a cylindrical portion and a standing portion. The cylindrical portion is adapted to be press-fit onto an outer circumference of the inner member. The standing portion extends radially outward from the cylindrical portion. The sealing member includes a base portion covering an inner circumferential surface of the metal core. A side lip inclines radially outward from the base portion and slidingly contacts the standing portion of the slinger, via a predetermined axial interference. A bifurcated radial lip is formed radially inward from the side lip. It includes a grease lip and dust lip slidingly contacting the cylindrical portion of the slinger, via a predetermined radial interference. A garter spring is mounted on the dust lip. The tightening force of the garter spring is set to 50% or more of total tightening force of the radial lip. The tightening force of the radial lip, without the garter spring, is set to 3N or more.

One embodiment of the present disclosure will be described with reference to accompanied drawings.

FIG. 1 is a longitudinal-section view of one embodiment of a seal device of a wheel bearing. FIG. 2 is a partially enlarged view of FIG. 1 of one seal device. FIG. 3 is an explanatory view of a total tightening force of the seal device of FIG. 2. FIG. 4 is an explanatory view showing a tightening force under a condition where the dust lip is not provided with a garter spring. FIG. 5 is a graph showing measurement results of the tightening force of a radial lip under a severe environment at normal temperature. FIG. 6 is a graph showing measurement results of the tightening force of a radial lip under a severe environment at low temperature. In the description in this specification, an outer side of the seal device, when it is mounted on a vehicle, is referred to as the "outboard-side" (left side of FIG. 1) and the inner side of the seal device is referred to as the "inboard-side" (right side of FIG. 1).

The wheel bearing 1 shown in FIG. 1 is a so-called "first generation" type. It has an outer member (outer ring) 2 formed, on its inner circumference, with tapered double row outer raceway surfaces 2a, 2a opened toward an axially inboard-side and outboard-side. A pair of inner rings 3, 3 are each formed with tapered inner raceway surface 3a on their outer circumference. The inner raceway surfaces 3a oppose the double row outer raceway surfaces 2a, 2a. Double row rolling elements (tapered rollers) 5, 5 are contained between the outer and inner raceway surfaces 2a, 2a and 3a, 3a, via cages 4.

A larger diameter end of the inner raceway surface 3a of each inner ring 3 is formed with a cone back face rib 3b to guide the rolling elements 5. A cone front face rib 3c is formed on a smaller diameter end of the inner raceway surface 3a to prevent slipping-off of the rolling elements 5. The smaller diameter ends of the pair of inner rings 3, 3 abut each other to form a back-to-back duplex type wheel bearing.

The outer member 2, inner rings 3 and rolling elements 5 are made of high carbon chrome steel such as SUJ2. They are hardened to their core by dip quenching to have a surface hardness of 58 to 64 HRC. Seal devices 6, 7 are arranged in annular opening spaces formed between the outer member 2 and the inner rings 3, 3. The seal devices 6, 7 prevent leakage of grease contained within the bearing as well as entry of rainwater or dust into the bearing.

An annular connection member 9 is fit into annular grooves 8, 8. The annular grooves 8, 8 are each formed on the smaller diameter end of the inner circumference of each inner ring 3. The annular connection member 9 is press-formed from a steel sheet, such as tool steel and spring steel etc. It has an ended ring having a "C"-shaped cross-section. It is hardened by thermal refining or quenching to have a surface hardness of 40 to 55 HRC.

The pair of inner rings 3, 3 can be united without any rattle by fitting the annular connection member 9 into the annular grooves 8, 8. This makes easy assembly and disassembly operations. In addition, the paired inner rings 3, 3 are press-fit into an axle of a vehicle and can be integrally pulled out from the axle during service of bearing device. Thus, it is possible to prevent that only inboard-side inner ring 3 will remain on the axle.

Although it is shown here with double row tapered roller bearing using tapered rollers as the rolling elements 5, the present disclosure may be applied to a double row angular contact ball bearing using balls as rolling elements. In addition, the present disclosure may be applied to not only the illustrated first generation type but also the second generation type, having an outer member formed with a flange, the third generation type, having inner raceway surface directly formed on the outer circumference of a wheel hub, and the fourth generation type, where an inner raceway surface is directly formed on the outer circumference of an outer joint member of a constant velocity universal joint.

The outboard-side seal device 6 is an integrated seal. It includes a metal core 10 press-fit into an end inner circumference of the outer member (outer ring) 2. A sealing member 11 is integrally adhered to the metal core by vulcanized adhesion. The metal core 10 is press-formed from austenitic stainless steel sheet (JIS SUS 304 etc.) or cold rolled steel sheet (JIS SPCC etc.) to have a substantially L-shaped cross-section. The sealing member 11 is formed from synthetic rubber such as NBR (acrylonitrile butadiene rubber) and has a bifurcated radial lip. A grease lip 11a and a dust lip 11b slidingly contact the outer circumference of the inner ring 3. The sealing member 11 is adhered to the metal core 10 to wrap up its external surface to form a so-called "half metal structure". This improves the sealability and protects the inside of the bearing.

There are other examples of materials for the sealing member 11 other than NBR, e.g. HNBR (hydrogenation acrylonitric-butadiene rubber), EPDM (ethylene propylene rubber), ACM (poly-acrylic rubber), FKM (fluororubber) or silicone rubber etc. which are superior in heat and/or chemical resistance.

As shown in the enlarged view of FIG. 2, the inboard-side seal device 7 includes an annular sealing plate 12 and an annular slinger 13. Each has a substantially L-shaped cross-section and is arranged opposite toward each other. This forms a so-called "pack seal". The sealing plate 12 includes a metal core 14 to be press-fit into the outer member (outer ring) 2. A sealing member 15 is integrally adhered to the metal core 14.

The metal core 14 is press-formed from austenitic stainless steel sheet or cold rolled steel sheet to have a substantially L-shaped cross-section. It has a cylindrical fitting portion 14a and a radially inner portion 14b. The cylindrical fitting portion 14a is press-fit into an end inner circumference of the outer member (outer ring) 2. The radially inner portion 14b extends radially inward from one end of the fitting portion 14a. The tip end of the fitting portion 14a of the metal core 14 is thinned. The sealing member 15 is adhered to the tip end so that it wraps up the tip end to form a so-called "half metal structure".

The sealing member 15 is formed of synthetic rubber such as NBR. It has a base portion 15a, a side lip 15b and a bifurcated radial lip. The base portion 15a covers an inner circumferential surface of the fitting portion 14a of the metal core 14. The side lip 15b is inclined radially outward from the base portion 15a. The bifurcated radial lip, including a grease lip 15c and a dust lip 15d, is radially inward from the side lip 15b. A garter spring 17 formed, e.g. of austenitic stainless steel, is mounted on the dust lip 15d of the radial lip. High corrosion resistance can be provided by forming the garter spring 17 from austenitic stainless steel. Examples of materials of the sealing member 15 other than NBR are e.g. HNBR, EPDM, ACM, FKM or silicone rubber etc. which are superior in heat resistance.

The base portion 15a of the sealing member 15 is inclined toward the tip end of the fitting portion 14a of the metal core 14. The outer peripheral edge of a standing portion 13b of a slinger 13 opposes the tip end of the sealing member 15 via a slight radial gap "C". This forms a labyrinth seal 16 therebetween. This prevent the entry of rain water or dust from the outside into the inside of the bearing. Also, it discharges, once entered rain water or dust, to the outside of the bearing by centrifugal force. Thus, this improves the sealability of the bearing.

According to the present embodiment, TR 10 of the sealing member is set to −35° C. or less. "TR 10" is an index indicating the elasticity of rubber and means that the elastic recovery rate at a low temperature of the sealing member 15 is 10%. This keeps lip followability under low temperature environments. Thus, this improves the muddy water resistance.

The slinger 13 is press-formed of ferritic stainless steel sheet (JIS SUS 430 etc.) or preserved cold rolled steel sheet. It has a substantially L-shaped cross-section and includes a cylindrical portion 13a and a standing portion 13b. The cylindrical portion 13a is press-fit into an end outer circumference of the inner ring 3. The standing portion 13b extends radially outward from the cylindrical portion 13a. The side lip 15b of the sealing member 15 slidingly contacts the standing portion 13b, via a predetermined axial interference. The radial lip, the grease lip 15c and the dust lip 15d, slidingly contacts the cylindrical portion 13a, via a predetermined radial interference.

The magnetic encoder 18 is integrally adhered to the inboard-side surface of the standing portion 13b of the slinger, by vulcanized adhesion. The magnetic encoder 18 is formed of an elastomer such as synthetic rubber mingled with magnetic powder, such as ferrite. The magnetic encoder 18 forms a rotary encoder to detect the wheel speed. The magnetic encoder 18 has N and S poles alternately arranged along its circumference. The slinger 13 is formed of ferritic steel sheet. Thus, it is possible to prevent corrosion of the slinger 13 for a long term and increase the magnetic output of the encoder 18 to ensure stable detecting accuracy.

A sealability test was carried out in severe environments. The test intended to determine a relationship between sealability and a ratio of the tightening force Pg of the garter spring 17 for the total tightening force Pa of the radial lip, the grease lip 15c and the dust lip 15d. That is, each ratio ((Pa−Pb)/Pa) was obtained to determine the sealability. Pa is the total tightening force of the radial lip (see FIG. 3). Pb is the tightening force of the radial lip without the garter spring 17. In this case, the tightening force almost corresponds to that of the dust lip 15d. The results of which are shown in Table 1. The seal device used in this test has specifications of a cross-section height H: 7.0 mm, a width W: 5.0 mm and a radial gap C of the labyrinth seal: 0.75 mm (see FIG. 2).

TABLE 1

| | Pg [%] | | | | | |
|---|---|---|---|---|---|---|
| | 0 | 28 | 42 | 51 | 56 | 60 |
| Sealability | x (low) | x (low) | x (low) | o (high) | o (high) | o (high) |

Since the garter spring 17 is more immune to the temperature effect than the synthetic rubber, it is believed that the sealability can be assured so that the ratio of the tightening force of the garter spring 17 is high. From the results of this test, it is found that at least a 50% ratio of the tightening force Pg of the garter spring of the total tightening force Pa of the radial lip is required in order to assure the sealability of the wheel bearing.

In addition, the applicant carried out a confirmation test of a relationship between the tightening force Pa and the durability of the radial lip (the dust lip and the grease lip) at normal temperatures and low temperatures. The results are shown in FIGS. 5 and 6. As can be seen from the results of test, 12N or more tightening force Pa of the radial lip (Pa≥12N) is required at the normal temperature (20° C.). This clears the spec value T which is a pass/fail determination criteria (see FIG. 5). It has been found that 10N or more of tightening force Pa of the radial lip (Pa≥10N) is required at low temperatures (−20° C.) to clear the spec value T, which is pass/fail determination criteria (see FIG. 6). Furthermore, the dust lip 15d requires a tightening force to at least hold its rigidity for the garter spring 17. The tightening force Pb of the radial lip without the garter spring 17 is set to 3N or more (Pb≥3N).

FIG. 8 is a cross-sectional view of a "second generation" type wheel bearing. The elements that are the same are identified with the same reference numbers.

Here the outer member 22 includes a mounting flange 22a. The pair of inner rings 3 rest on a wheel hub 21 outer surface 21a and are secured by a caulked portion 23. Spines 21b secure with a spigot of a constant velocity joint. Flange 20 receives hub bolts.

FIG. 9 is a cross-sectional view of a "third generation" type wheel bearing. The elements that are the same are identified with the same reference numerals.

Here the wheel hub 24 includes an inner raceway surface 24a and an axially extending cylindrical portion 24b. An inner ring 25 is secured on the cylindrical portion 24b by caulked portion 23a. A seal 27 is positioned between the outer 22 and inner member 23.

Figure 10:
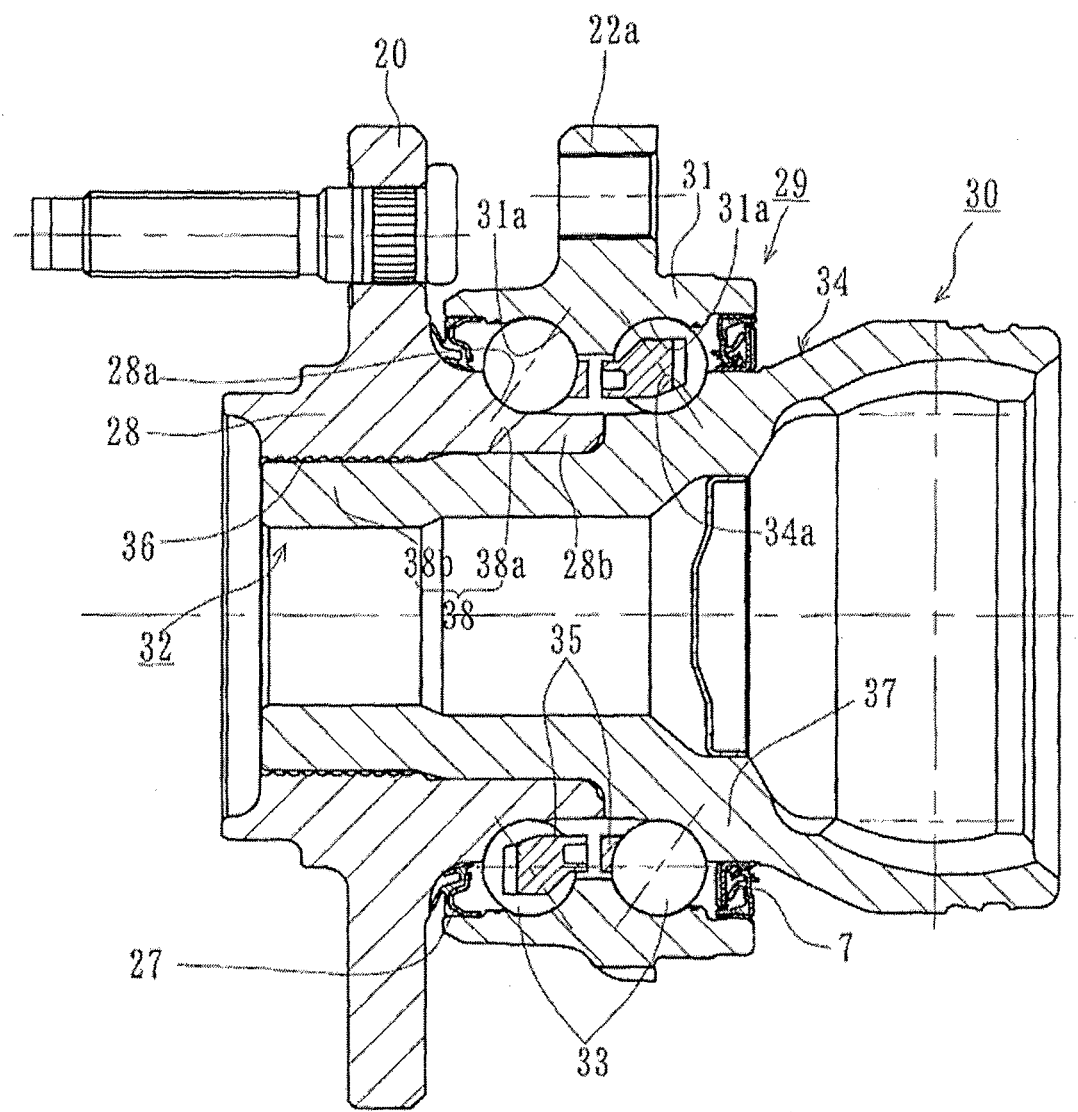
FIG. 10 is a cross-section view of a fourth generation type wheel bearing.

FIG. 10 is a cross-sectional view of a "fourth generation" type wheel bearing. The elements that are the same are identified with the same reference numerals.

Here the outer member 25 has double row outer raceway surfaces 31a that receive balls 33, 33, held by cages 35, as the rolling elements. The inner member wheel hub 28 includes one inner raceway surface 28a. A cylindrical portion 28b axially extends from the inner raceway 28a. An outer member 30 of a constant velocity joint is secured by its spigot 32 with the wheel hub inner surface 36. The spigot 32 has a first cylindrical portion 38a fit into the axial portion 28b and a second cylindrical portion 38b coupled with the inner surface 36. The mouth 34 of the outer member 30 includes a shoulder portion 37. The shoulder portion 37 includes the second inner raceway surface 34a.

As described above, according to the present disclosure it is possible to provide a seal device for a wheel bearing with a pack seal used under severe environmental conditions that can eliminate variation of the sealability between normal temperatures and low temperatures. This improves the sealability under the low environmental temperatures and muddy water environments by analyzing the rate of the tightening force of the garter spring for the total tightening force of the radial lip.

The seal device for a wheel bearing of the present disclosure can be applied to wheel bearings of inner ring rotation structure of the first through fourth generation types.

The present disclosure has been described with reference to the preferred embodiment. Obviously, modifications and alternations will occur to those of ordinary skill in the art upon reading and understanding the above detailed description. It is intended that the present disclosure be construed to include all such alternations and modifications insofar as they come within the scope of the appended claims or their equivalents.

What is claimed is:

1. A wheel bearing and seal device comprising:
an outer member formed with double row outer raceway surfaces on an inner circumference of the outer member, an inner member including a wheel hub and at least one inner ring or an outer member of a constant velocity universal joint fit with a cylindrical portion of the wheel hub, the wheel hub is integrally formed, on one end, with a wheel mounting flange, a cylindrical portion axially extends from the wheel mounting flange, the inner member is formed with double row inner raceway surfaces on its outer circumference that opposes the double row outer raceway surfaces, double row rolling elements are rollably contained between the inner and outer raceway surfaces, the seal device is mounted on the wheel bearing to seal an annular opening space formed between the outer member and inner member;
the seal device is formed as a pack seal comprising an annular sealing plate and an annular slinger, the annular sealing plate and annular slinger have a substantially "L" shaped cross-section and are arranged opposite toward each other, the sealing plate comprises a metal core and a sealing member integrally adhered to the metal core, via galvanized adhesion, the metal core is press-formed from steel sheet and includes a cylindrical fitting portion and a radially inner portion, the cylindrical fitting portion is adapted to be press-fit into an inner circumference of the end of the outer member, via a predetermined interference, the radially inner portion extends radially inward from one end of the fitting portion, the slinger comprising a cylindrical portion and a standing portion, the cylindrical portion is adapted to be press-fit onto an outer circumference of the inner member, the standing portion extends radially outward from the cylindrical portion, the sealing member comprising a base portion, a side lip and a radial lip, the base portion covers an inner circumferential surface of the metal core, the side lip inclines radially outward from the base portion and slidingly contacts the standing portion of the slinger via a predetermined axial interference, the radial lip inclines radially inward from the side lip and slidingly contacts the cylindrical portion of the slinger, via a predetermined radial interference; and
a garter spring is mounted on the radial lip, a tightening force of the garter spring (Pg) is set to 50% or more of a total tightening force of the radial lip (Pa), and the tightening force of the radial lip (Pb) without the garter spring is set to 3N or more.

2. The wheel bearing and seal device of claim 1, wherein the total tightening force of the radial lip at normal temperature (20° C.) is set to 12N or more.

3. The wheel bearing and seal device of claim 1, wherein the total tightening force of the radial lip at low temperature (−20° C.) is set to 10N or more.

4. The wheel bearing and seal device of claim 1, wherein TR 10 of the sealing member is set to −35° C. or less.

5. The wheel bearing and seal device of claim 1, wherein the garter spring is formed from stainless steel.

6. The wheel bearing and seal device of claim 1, wherein a tip end of the fitting portion of the metal core is thinned and the sealing member is adhered to the tip end so that it wraps up the tip end to form a "half metal structure".

7. The wheel bearing and seal device of claim 1, wherein the base portion of the sealing member inclines toward the tip end of the fitting portion of the metal core, and an outer peripheral edge of the standing portion of the slinger opposes the tip end of the sealing member via a slight radial gap (C) to form a labyrinth seal therebetween and the radial gap (C) is set to 0.75 mm or less.

8. A seal device comprising:
a pack seal comprising an annular sealing plate and an annular slinger, the annular sealing plate and annular slinger have a substantially "L" shaped cross-section and are arranged opposite toward each other, the sealing plate comprises a metal core and a sealing member integrally adhered to the metal core, via galvanized adhesion, the metal core is press-formed from steel sheet and includes a cylindrical fitting portion and a radially inner portion, the cylindrical fitting portion is adapted to be press-fit into an inner circumference of an end of an outer member, via a predetermined interference, the radially inner portion extends radially inward from one end of the fitting portion, the slinger comprising a cylindrical portion and a standing portion, the cylindrical portion is adapted to be press-fit onto an outer circumference of an inner member, the standing portion extends radially outward from the cylindrical portion, the sealing member comprising a base portion, a side lip and a radial lip, the base portion covers an inner circumferential surface of the metal core, the side lip inclines radially outward from the base portion and slidingly contacts the standing portion of the slinger via a predetermined axial interference, the radial lip inclines radially inward from the side lip and slidingly contacts the cylindrical portion of the slinger, via a predetermined radial interference; and
a garter spring is mounted on the radial lip, a tightening force of the garter spring is set to 50% or more of a total tightening force of the radial lip, and the tightening force of the radial lip without the garter spring is set to 3N or more.

9. The seal device of claim 8, wherein the tightening force of the radial lip at normal temperature (20° C.) is set to 12N or more.

10. The seal device of claim 8, wherein the tightening force of the radial lip at low temperature (−20° C.) is set to 10N or more.

11. The seal device of claim 8, wherein TR 10 of the sealing member is set to −35° C. or less.

12. The seal device of claim 8, wherein the garter spring is formed from stainless steel.

13. The seal device of claim 8, wherein a tip end of the fitting portion of the metal core is thinned and the sealing member is adhered to the tip end so that it wraps up the tip end to form a "half metal structure".

14. The seal device of claim 8, wherein the base portion of the sealing member inclines toward the tip end of the fitting portion of the metal core, and an outer peripheral edge of the standing portion of the slinger opposes the tip end of the sealing member via a slight radial gap (C) to form a labyrinth seal therebetween and the radial gap (C) is set to 0.75 mm or less.

* * * * *

UNITED STATES PATENT AND TRADEMARK OFFICE
CERTIFICATE OF CORRECTION

PATENT NO. : 9,751,361 B2
APPLICATION NO. : 14/513039
DATED : September 5, 2017
INVENTOR(S) : Makoto Seki et al.

It is certified that error appears in the above-identified patent and that said Letters Patent is hereby corrected as shown below:

On the Title Page

Item (56), References Cited, FOREIGN PATENT DOCUMENTS, page 2, Column 1, Line 6, "JP 2005-299685/" should be -- JP 2005-299685 --.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*